(12) United States Patent
Foster et al.

(10) Patent No.: US 9,394,850 B2
(45) Date of Patent: Jul. 19, 2016

(54) METAL GASKET WITH COATING TOPOGRAPHY

(71) Applicant: Dana Automotive Systems Group, LLC, Maumee, OH (US)

(72) Inventors: Jeffery A. Foster, North Aurora, IL (US); Thomas P. Plunkett, Aurora, IL (US); Dennis F. Person, Rockford, IL (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 100 days.

(21) Appl. No.: 13/958,667

(22) Filed: Aug. 5, 2013

(65) Prior Publication Data

US 2014/0042711 A1 Feb. 13, 2014

Related U.S. Application Data

(60) Provisional application No. 61/681,718, filed on Aug. 10, 2012.

(51) Int. Cl.
*F02F 11/00* (2006.01)
*F16J 15/08* (2006.01)

(52) U.S. Cl.
CPC ........... *F02F 11/002* (2013.01); *F16J 15/0825* (2013.01); *F16J 2015/085* (2013.01); *F16J 2015/0856* (2013.01); *F16J 2015/0862* (2013.01)

(58) Field of Classification Search
CPC . F16J 15/0818; F16J 15/0825; F16J 15/0831; F16J 2015/0837; F16J 2015/0843; F16J 2015/085; F16J 2015/0856; F16J 2015/0862; F16J 2015/0868; F02F 11/002
See application file for complete search history.

(56) References Cited

U.S. PATENT DOCUMENTS

| | | | |
|---|---|---|---|
| 4,140,323 A | | 2/1979 | Jacobs |
| 5,431,418 A | | 7/1995 | Hagiwara et al. |
| 5,582,415 A | | 12/1996 | Yoshida |
| 5,626,348 A | * | 5/1997 | Takada et al. ................. 277/593 |
| 5,626,350 A | | 5/1997 | Kuboushi et al. |
| 5,690,343 A | | 11/1997 | Takada et al. |
| 6,089,572 A | * | 7/2000 | Plunkett ........................ 277/592 |
| 6,105,971 A | | 8/2000 | Hasegawa |

(Continued)

FOREIGN PATENT DOCUMENTS

| | | |
|---|---|---|
| DE | 20021017 U1 | 2/2001 |
| DE | 10015604 A1 | 10/2001 |

(Continued)

OTHER PUBLICATIONS

International Search Report and Written Opinion—PCT/US2013/053920.

(Continued)

*Primary Examiner* — Kristina Fulton
*Assistant Examiner* — Nicholas L Foster
(74) *Attorney, Agent, or Firm* — Marshall & Melhorn, LLC

(57) ABSTRACT

A gasket is provided having a first metallic layer and a second metallic layer. Both layers have combustion openings where each opening is surrounded by an edge of the layer. The first layer defines several beads and lands unitary with one another. A coating is located within one of the beads of the first layer and below the associated lands. The second layer has several lands and a bead in a particular orientation with respect to the beads and lands of the first layer.

13 Claims, 10 Drawing Sheets

(56) References Cited

U.S. PATENT DOCUMENTS

| | | | |
|---|---|---|---|
| 6,145,847 A | | 11/2000 | Maeda et al. |
| 6,328,314 B1 * | | 12/2001 | Jinno .................. F16J 15/0825 277/593 |
| 6,349,945 B1 | | 2/2002 | Schmucker et al. |
| 6,354,599 B1 | | 3/2002 | Inamura |
| 6,422,573 B1 | | 7/2002 | Sekioka |
| 6,431,554 B1 | | 8/2002 | Miyamoto et al. |
| 6,527,277 B2 | | 3/2003 | Hegmann |
| 6,565,097 B2 | | 5/2003 | Jinno |
| 6,644,669 B2 | | 11/2003 | Unseld et al. |
| 6,708,982 B2 | | 3/2004 | Zerfass et al. |
| 6,712,364 B2 | | 3/2004 | Unseld et al. |
| 6,746,021 B2 | | 6/2004 | Breen |
| 6,827,352 B2 | | 12/2004 | Ueta et al. |
| 6,948,714 B1 | | 9/2005 | Quick |
| 6,957,815 B1 | | 10/2005 | Inciong |
| 7,137,631 B2 | | 11/2006 | Udagawa et al. |
| 7,234,705 B2 | | 6/2007 | Novil et al. |
| 7,367,566 B2 | | 5/2008 | Udagawa et al. |
| 2002/0079651 A1 * | | 6/2002 | Unseld .................. F02F 11/002 277/592 |
| 2003/0075874 A1 * | | 4/2003 | Inamura ............... F16J 15/0818 277/593 |
| 2003/0151211 A1 | | 8/2003 | Chen et al. |
| 2004/0012155 A1 * | | 1/2004 | Diez ...................... F16J 15/068 277/593 |
| 2004/0217552 A1 * | | 11/2004 | Sueda ............................ 277/592 |
| 2005/0189724 A1 | | 9/2005 | Schmitz |
| 2006/0097460 A1 | | 5/2006 | Udagawa et al. |
| 2006/0232017 A1 | | 10/2006 | Hamada et al. |
| 2009/0102138 A1 | | 4/2009 | Hoehe |
| 2011/0127729 A1 * | | 6/2011 | Takeda ................. F16J 15/0818 277/592 |

FOREIGN PATENT DOCUMENTS

| | | |
|---|---|---|
| EP | 0 982 517 A1 | 3/2003 |
| JP | 20002335 A | 1/2000 |
| JP | 3314371 B2 | 6/2002 |
| JP | 2003322256 A | 11/2003 |
| WO | 02/36996 A1 | 5/2002 |
| WO | 2009/130044 A1 | 10/2009 |

OTHER PUBLICATIONS

English Abstract of DE10015604.
English Abstract of DE20021017—Published as U.S. Pat. No. 6,712,364.

* cited by examiner

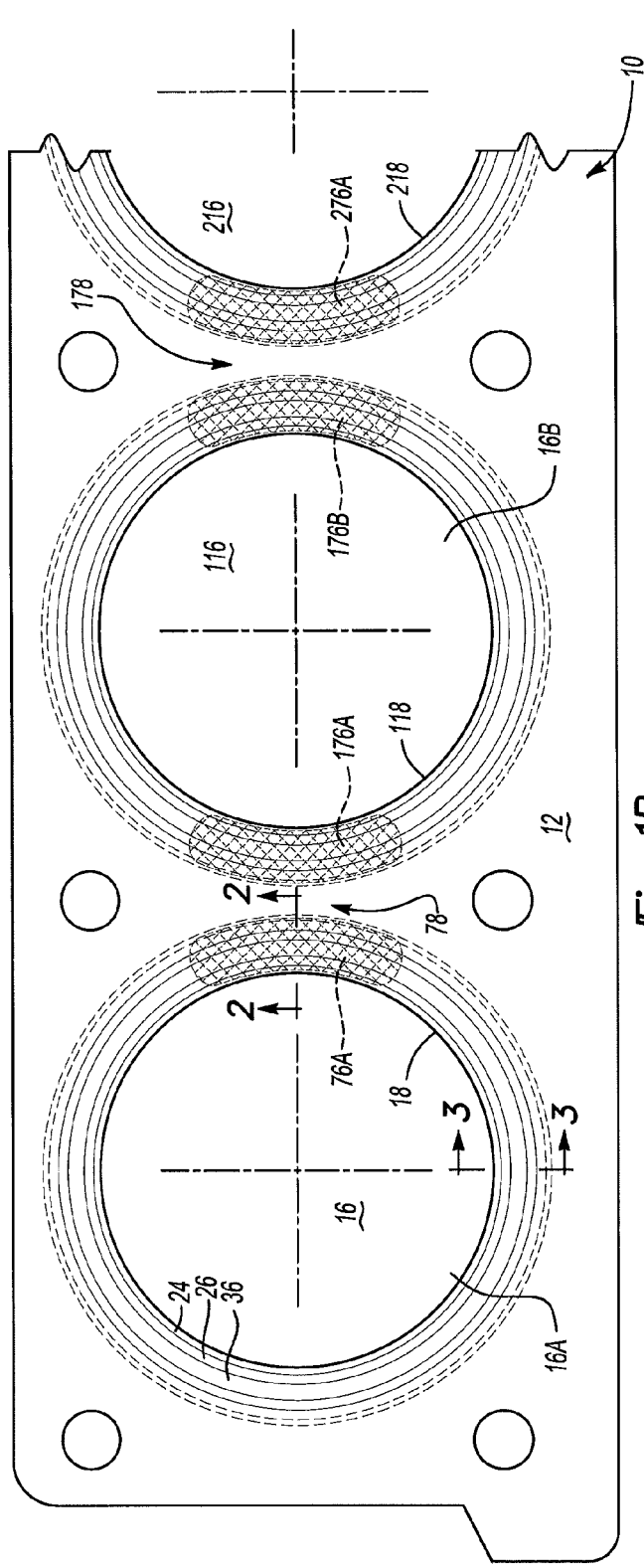
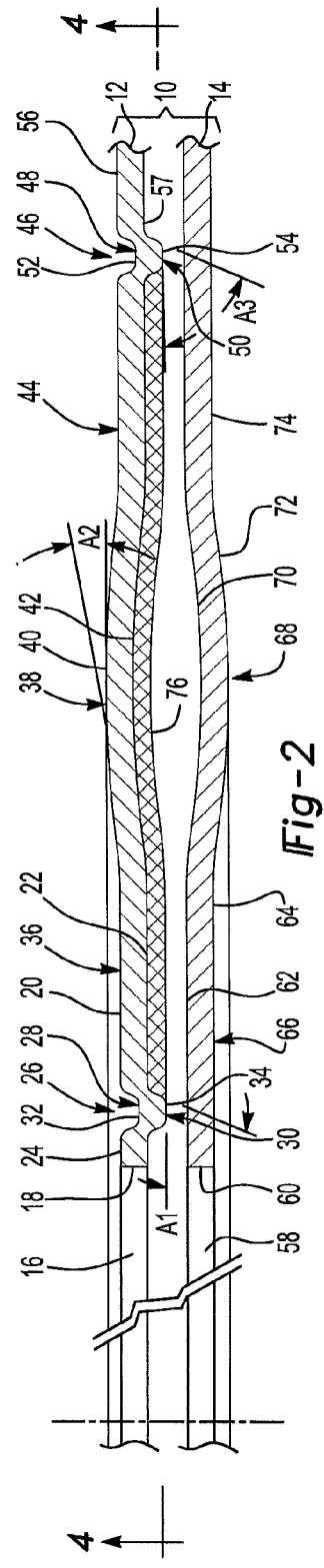
Fig-1B
Fig-2

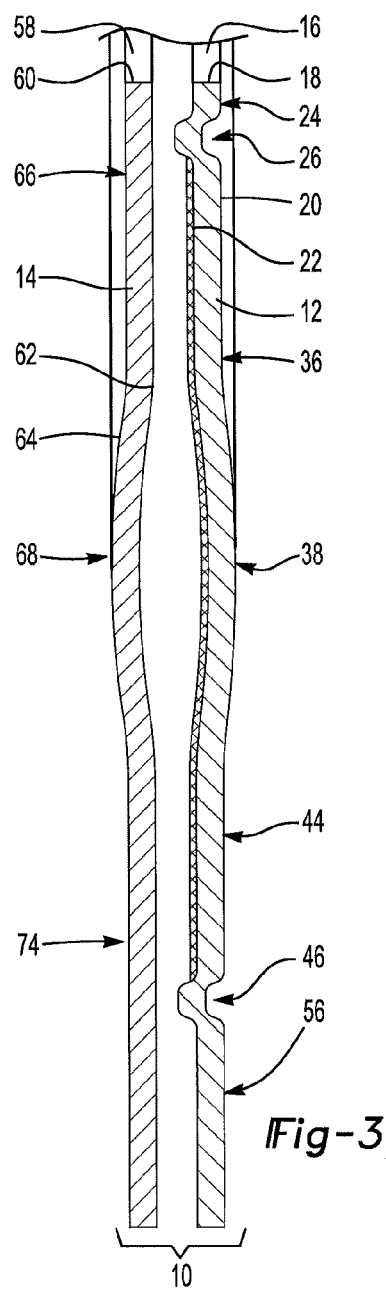
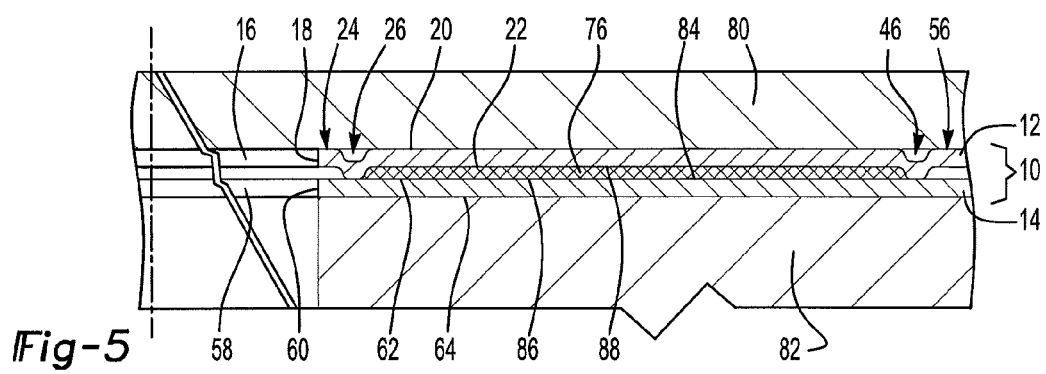

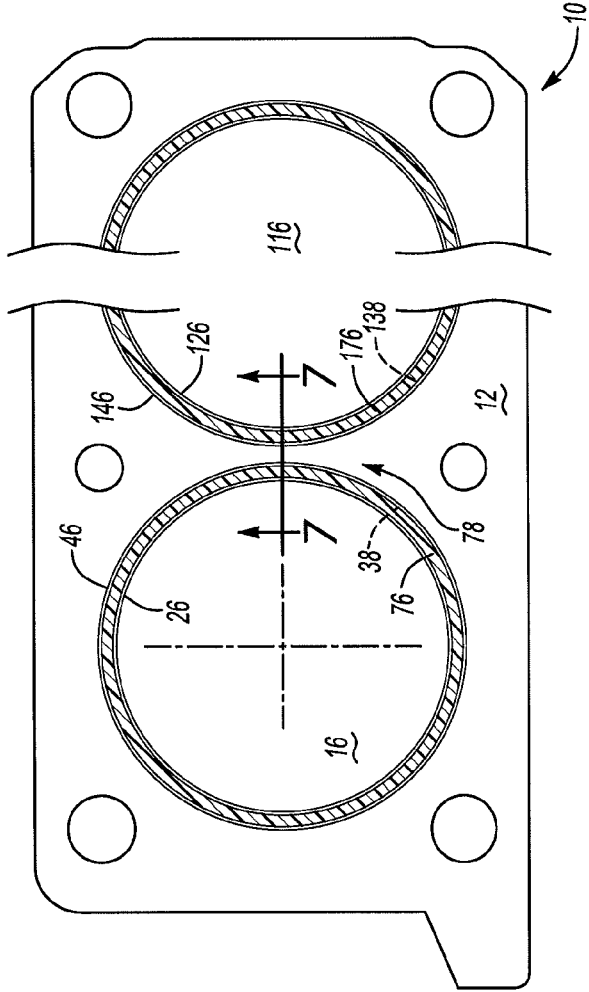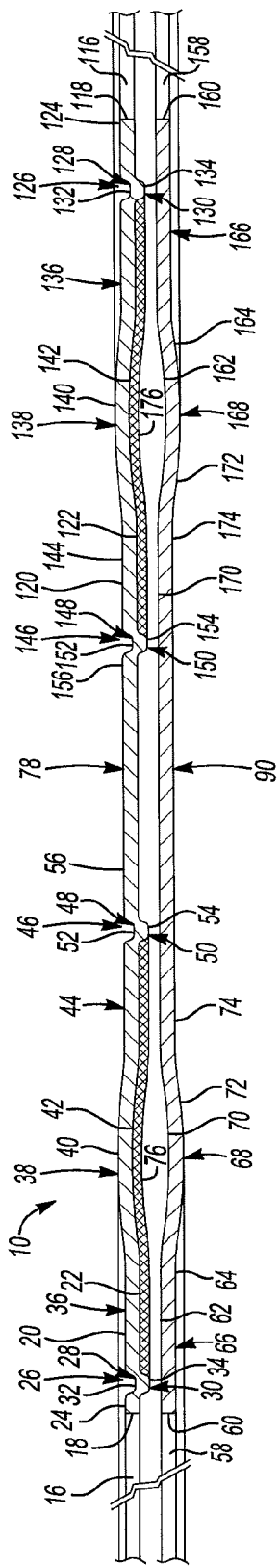

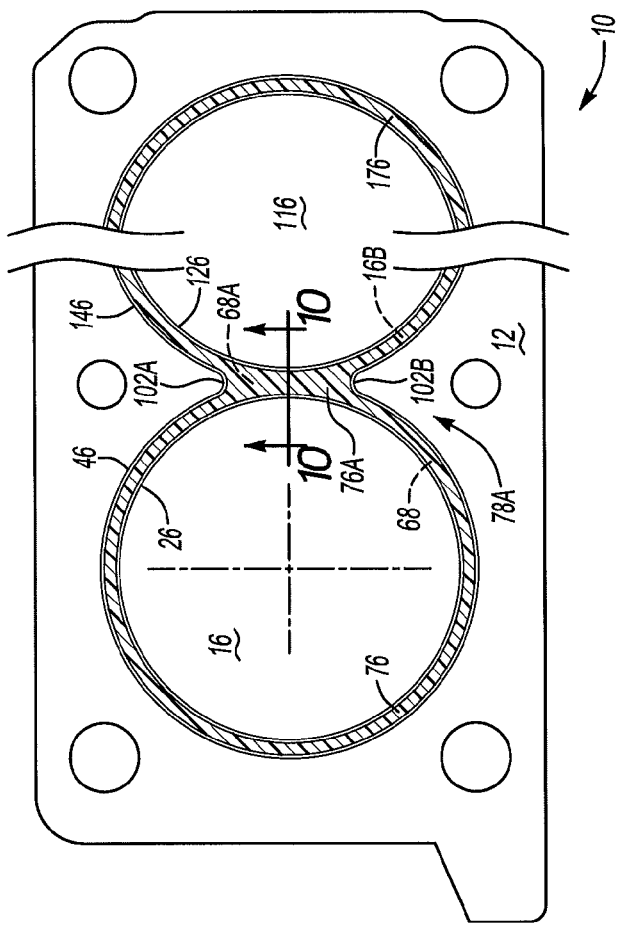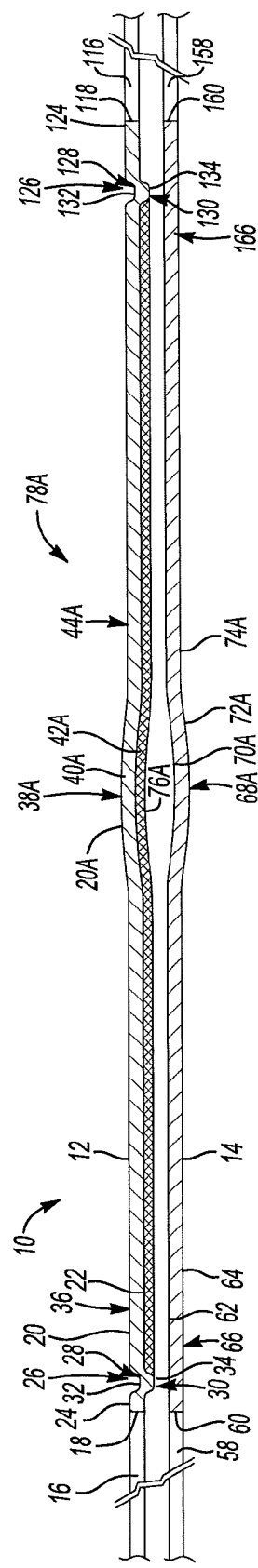

METAL GASKET WITH COATING TOPOGRAPHY

RELATED APPLICATION

This application claims the benefit under 35 U.S.C. §119 (e) of U.S. Provisional Patent Application Ser. No. 61/681,718, filed Aug. 10, 2012 and U.S. Provisional Patent Application Ser. No. 61/681,740, filed Aug. 10, 2012, which are incorporated by reference herein in their entirety.

FIELD OF THE INVENTION

The present invention relates to a multi-layer metallic gasket with a coating selectively located between two gasket layers.

BACKGROUND OF THE INVENTION

Gaskets are often used as a seal between mating mechanical components. One common application involves gasket placement between the engine block and the cylinder head of an internal combustion engine. Cylinder head gaskets typically extend around the cylinder bores to provide a combustion seal, maintaining the high temperature gases of combustion with the cylinder bores. At the same time, the gaskets also seal fluid flow openings such as coolant and oil openings to prevent undesirable mixing. In addition, such gaskets prevent leakage by sealing the areas around the bolts which connect the cylinder head and engine block. Gaskets bear the load from a bolted connection between the head and the block and they rely upon that load to provide a seal.

It is known to locate one or more additional metal layers, or pieces of layers, both of which may be referred to as shims, between the active gasket layers. A shim is typically made of metal and may have a constant thickness. Shims typically are not compressible and thus may assist in creating a sealing feature for the gasket when the gasket is compressed.

Shims, however, do have some significant disadvantages. More particularly, when the gasket is compressed the loading of the shim between the cylinder bores is typically poor. Typically, this is because the mechanical fasteners connecting the cylinder head and the block are distant from the land area between the bores. Generally, as the distance from a mechanical fastener increases, the compression force provided by that mechanical fastener decreases. If the shim is not properly loaded, it may result in premature failure or overall poor performance of the gasket.

It is also known to use coatings for various purposes in gaskets. Coatings may be advantageous as they can be inexpensive, depending on their composition and method of application, to apply to gasket material. Some coatings are provided with a predetermined thickness in order to limit compression in certain areas of a gasket.

It would be advantageous to utilize the inexpensive and ease of use charateristics of a coating with the compression adding features of a shim without incurring the disadvantages associated with the shim and coating.

SUMMARY OF THE INVENTION

In one embodiment, the present invention is directed toward a gasket having a first metallic layer and a second metallic layer. Both layers may have a plurality of combustion openings therein, where each opening is circumscribed by a combustion opening edge.

The first layer has an upper surface and a lower surface that is substantially parallel to the upper surface. The surfaces define a first land axially outward from the combustion opening edge of the first layer. The first layer also comprises a first bead, a second land, a second bead, a third land, a third bead and a fourth land. The beads and lands are unitary with one another within the first layer. A coating is located within one of the beads of the first layer.

The second layer has a first land, a second land and a bead between the lands. The lands and the bead are unitary with one another within the second layer. The beads and lands of the second layer are in a particular orientation with respect to the beads and lands of the first layer.

Further aspects of the present invention, together with the organization and operation thereof, will become apparent from the following detailed description of the invention when taken in conjunction with the accompanying drawings.

BRIEF DESCRIPTION OF THE DRAWINGS

The above, as well as other advantages of the present invention, will become readily apparent to those skilled in the art from the following detailed description when considered in the light of the accompanying drawings in which:

FIG. 1B is a partial plan view of a modification to the gasket of FIG. 1A;

FIG. 2 is cross-section side view along lines 2-2 of both FIG. 1A and FIG. 1B;

FIG. 3 is a cross-section side view along lines 3-3 of FIG. 1A;

FIG. 5 is a partial cross-section side view of the present invention located between a cylinder head and a cylinder block;

FIG. 6 is another partial plan view of the gasket of FIG. 1A;

FIG. 7 is a cross-section view along lines 7-7 of FIG. 6;

FIG. 9 is a partial plan view of another gasket in accordance with the present invention;

FIG. 10 is a cross-section view along lines 10-10 of FIG. 9;

Further aspects of the present invention, together with the organization and operation thereof, will become apparent from the following detailed description of the invention when taken in conjunction with the accompanying drawings.

DETAILED DESCRIPTION OF THE INVENTION

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1A:
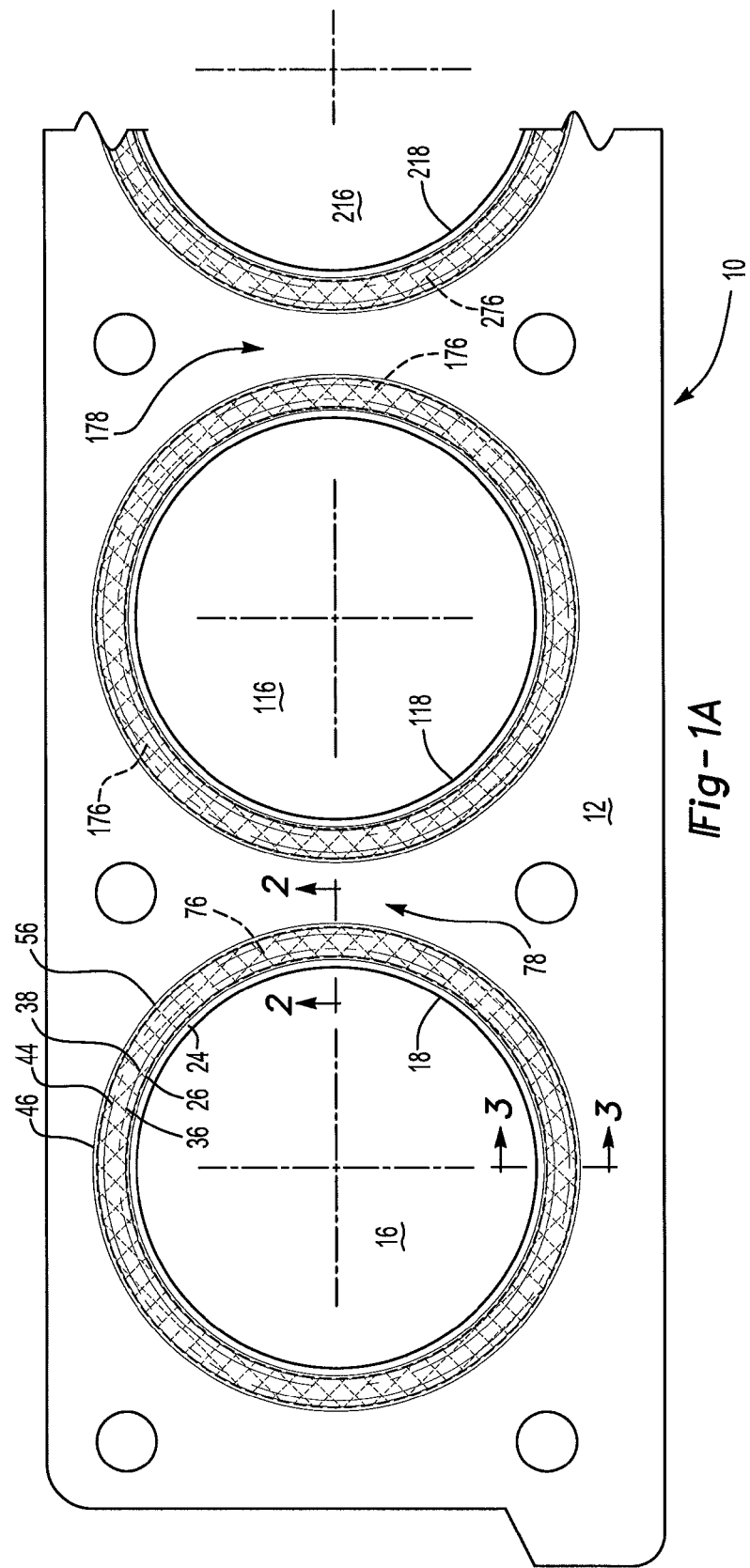
FIG. 1A is a partial plan view of a gasket in accordance with the present invention.

Turning now to FIGS. 1A and 2, one embodiment of a gasket 10 of the present invention is depicted. The gasket 10 may be such as a cylinder head gasket, but it may be used for other purposes as well.

The gasket 10 is provided with a first metallic layer 12 and a second metallic layer 14. The first metallic layer 12 has at least one combustion opening 16, 116, 216 located therein. Preferably, each opening 16, 116, 216 extends entirely through the layer 12. Each opening 16, 116, 216 is circumscribed by a combustion opening edge 18, 118, 218 of the first layer 12 (also see FIG. 7).

Specifically referring to the area around the first opening 16, an upper surface 20 and a lower surface 22 extend axially outward from the combustion opening edge 18. The surfaces 20, 22 remain substantially parallel to one another even with the various physical features of the layer 12 as described below. The parallel nature of the surfaces 20, 22 results in a layer 12 with substantially constant thickness.

The upper and lower surfaces 20, 22 define between them a one-piece, integrally formed, unitary first land 24. The first land 24 is located directly axially outward from the combustion opening edge 18.

A first bead 26 is formed in a one-piece, integrally formed, unitary fashion with the first land 24. The first bead 26 forms a first depression 28 in the upper surface 20 of the first layer 12 because it is concave. As the first bead 26 extends consistently through the first layer 12, it creates a first crest 30, or convex shape, in the lower surface 22 of the first layer 12.

The first depression 28 and first crest 30 may or may not be concave and convex, respectively, in the curvilinear sense. It is within the scope of the present invention for the depression 28 to have a planar floor 32 and for the crest 30 to have a planar surface 34.

A second land 36 is formed in a one-piece, integrally formed, unitary fashion with the first bead 26 in the first layer 12. The upper and the lower surfaces 20, 22 of the first layer 12 in the area of the first land 24 are substantially parallel.

A second bead 38 is formed in a one-piece, integrally formed, unitary fashion with the second land 36 in the first layer 12. The second bead 38 preferably has a convex shape. The angle of incline A2 of the second bead 38 in the first layer 12 is less steep as compared to the angle of incline A1 required to form the first bead 26. The second bead 38 forms a second crest 40 in the upper surface 20 of the first layer 12 and it creates a second depression 42 in the lower surface 22 of the first layer 12.

The upper surface 20 of the second bead 38 is curved and it is not planar with the upper surfaces 20 of the second land 36 or a third land 44, described below, of the first layer 12.

The third land 44 is formed in a one-piece, integrally formed, unitary fashion with the second bead 38 of the first layer 12. The upper and the lower surfaces 20, 22 of the first layer 12 in the area of the third land 44 are substantially parallel.

A third bead 46 is formed in a one-piece, integrally formed, unitary fashion with the third land 44. The third bead 46 forms a third depression 48 in the upper surface 20 of the first layer 12 because it is concave. The angle of incline A3 of the third bead 46 in the first layer 12 is approximately the same as the angle of incline A1 required to form the first bead 26. As the third bead 46 extends consistently through the first layer 12, it creates a third crest 50, or convex shape, in the lower surface 22 of the first layer 12.

The size and shape of the third bead 46 is identical to, or is similar to, the first bead 26. Similarly, the third depression 48 and third crest 50 may or may not be concave and convex, respectively, in the curvilinear sense. It is within the scope of the present invention for the depression 48 to have a planar floor 52 and for the crest 50 to have a planar surface 54.

The planar floors 32, 52 of the first bead 26 and the second bead 38 may be on the same vertical plane as one another. The planar floors 32, 52 are vertically offset from the upper surface 20 of the first layer 12.

A fourth land 56 is formed in a one-piece, integrally formed, unitary fashion with the third bead 46 of the first layer 12. The upper and the lower surfaces 20, 22 of the first layer 12 in the area of the fourth land 56 are substantially parallel.

Preferably, the upper surface 20 of the first layer 12 at the first land 24, the second land 36, the third land 44 and the fourth land 56 are substantially planar with one another. Further, it is preferred that the lower surface 22 of the first layer 12 at the first land 24, the second land 36, the third land 44 and the fourth land 56 are substantially planar with one another.

As stated above, the gasket 10 also has the second metallic layer 14. The second metallic layer 14 is located directly vertically beneath the first layer 12. Besides a coating material described in more detail below, typically there are no other layers or materials located between the first layer 12 and the second layer 14.

The second metallic layer 14 has at least one combustion opening 58 located therein. Preferably, each opening 58 extends entirely through the layer 14. Each opening 58 is circumscribed by a combustion opening edge 60 of the second layer 14.

An upper surface 62 and a lower surface 64 extend axially outward from the combustion opening edge 60. The surfaces 62, 64 remain substantially parallel to one another even with the various physical features of the layer 14 as described below. The parallel nature of the surfaces 62, 64 results in a layer 14 with a substantially constant thickness.

The upper and lower surfaces 62, 64 define between them a one-piece, integrally formed, unitary first land 66. The first land 66 is located directly axially outward from the combustion opening edge 60.

A first bead 68 is formed in a one-piece, integrally formed, unitary fashion with the first land 66. The first bead 68 forms a first depression 70 in the upper surface 62 of the second layer 14 because it is concave. As the first bead 68 extends consistently through the second layer 14, it creates a first crest 72, or convex shape, in the lower surface 64 of the second layer 14.

A second land 74 is formed in a one-piece, integrally formed, unitary fashion with the first bead 68 in the second layer 14. The upper and the lower surfaces 62, 64 of the second layer 14 in the area of the second land 74 are substantially parallel.

Preferably, the first and second layers 12, 14 are arranged such that the second layer first land 66 is axially aligned with the first layer first land 24, the first layer first bead 26 and the first layer second land 36. It is also preferred that the second layer first bead 68 is axially aligned with the first layer second bead 38. Also, it is preferred that the second layer second land 74 is axially aligned with at least the third land 44, the third bead 46 and at least partially the fourth land 56 of the first layer 12.

As seen in FIGS. 1A, 1B, 4A, 4B, coatings 76, 76A, 176, 176A, 176B, 276, 276A are preferably located along the lower surface 22 of the first layer 12 between the first crest 30 and the third crest 50. The coatings 76, 76A, 176, 176A, 176B, 276, 276A may have a constant thickness about the combustion openings 16, 116, 216 or the thickness of the coatings 76, 76A, 176, 176A, 176B, 276, 276A may vary about the corresponding combustion opening 16, 116, 216. Further, the coatings 76, 76A, 176, 176A, 176B, 276, 276A may be substantially constant in their thickness axially from the corresponding combustion opening 16, 116, 216 or the thickness may vary axially from the opening 16, 116, 216.

It is to be noted that FIGS. 1A, 1B, 4A, 4B, 6, and 7 illustrate extended combustion openings items 116, 118, 124, 126, 176, 178, 216, and 276, which are the equivalent of the respective base combustion opening items 16, 18, 24, 26, 76, 78, 16, and 76 that are associated with the area around the first opening 16. Hence, any disclosure herein of the base combustion opening items 16, 18, 24, 26, 76, 78, 16, and 76 may be applied to the extended combustion opening items 116, 118, 124, 126, 176, 178, 216, and 276.

Figure 4A:
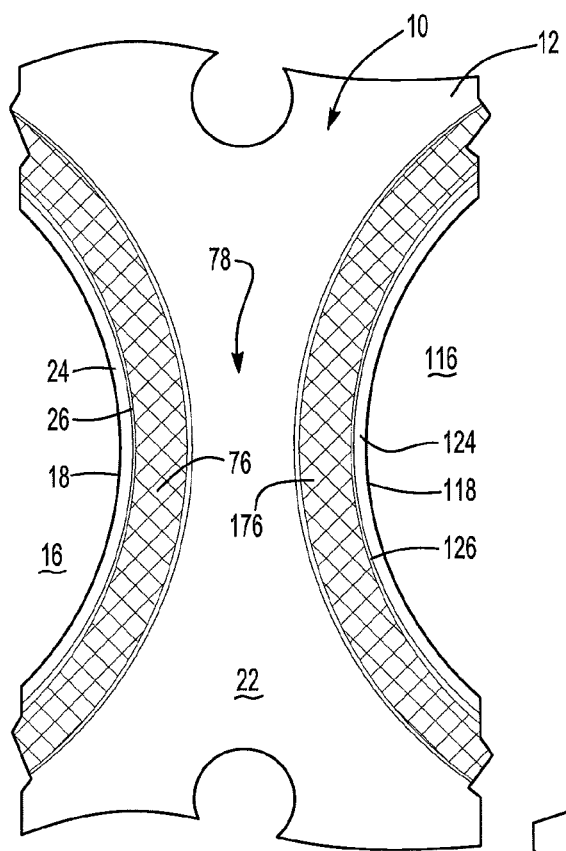
FIG. 4A is a view along lines 4-4 of FIG. 2 for the gasket of FIG. 1A.
Figure 4B:
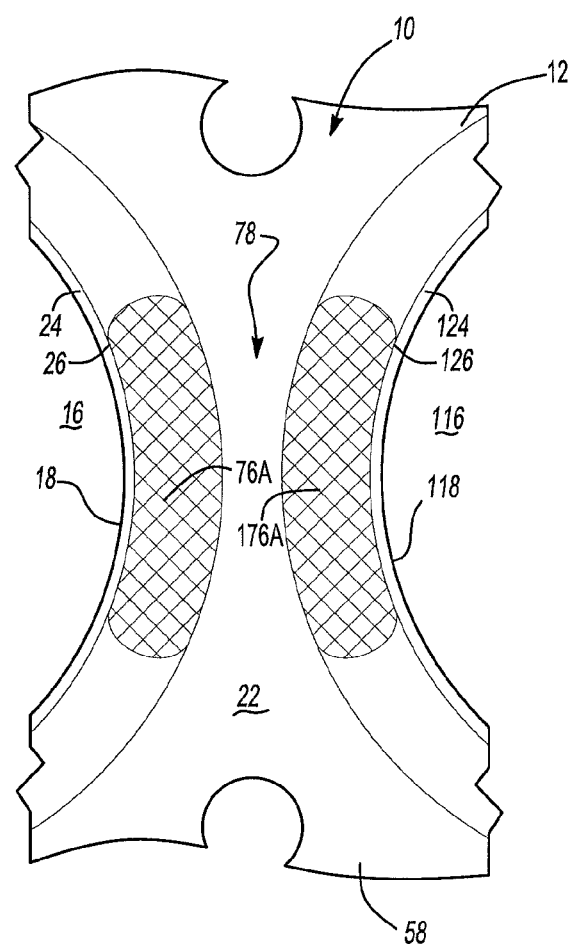
FIG. 4B is a view along lines 4-4 of FIG. 2 for the gasket of FIG. 1 B.

In the preferred embodiments depicted in FIGS. 2, 4A and 4B, the thickness, or topography, of the coatings 76, 176, 176A, 176B, 276A in the second depression 42 is substantially constant, or planar. The coatings 76, 176, 176A, 176B, 276A extend continuously along the lower surface of the second depression 42 from the first bead 26 to the third bead 46. More particularly, the coatings 76, 176, 176A, 176B, 276A are in contact with both the first bead 26 and the third bead 46. The first and third beads 26, 46 create dams that prevent the coatings 76, 176, 176A, 176B, 276A from moving axially beyond either.

The thickness of the coatings 76, 176, 176A, 176B, 276A, however, outside of the land areas 78, 178 between the combustion openings 18, 118, 218 may be reduced as shown in FIG. 3, or entirely foregone, or it may only extend partially from the first bead 26 to the third bead 46. Thus, the topography of the coating 76 may vary according to conditions the gasket 10 is exposed to.

The thickness, or even presence of the coatings 76, 176, 176A, 176B, 276A, is determined by the geometry and features of each individual gasket 10. It has been found that areas of the gasket 10 adjacent mechanical fasteners are highly compressed and may not require the additional compression provided by the coatings 76, 176, 176A, 176B, 276A for the gasket 10 to maintain a proper seal. Such fasteners are not typically located between the combustion openings 16, 116, 216, but compression of the gasket 10 is very important in these areas to maintain a proper seal. This is particularly true due to the increased pressure and forces experienced by the gasket adjacent the combustion openings 16 116, 216.

The coatings 76, 176, 176A, 176B, 276A may be such as rubber, or synthetic rubber material, adapted for the cyclic high temperature and high pressure environment of a cylinder head gasket. The coatings 76, 176, 176A, 176B, 276A may also be a bronze powder encapsulated within an epoxy material. Other materials robust enough to survive for prolong periods of time adjacent a combustion opening 16 for an internal combustion engine may also be used.

Regardless of the material selected, it is preferred that it be relatively hard and relatively incompressible. An incompressible material will not change its thickness under the above-described conditions or when it is located between a cylinder head 80 and a cylinder block 82 of an internal combustion engine, as shown in FIG. 5. The thickness of the coating 76 also will not change, or appreciably change, when it is located between the block 82 and the head 80 under compression and when it encounters upstanding features or depressions in either. In short, the coatings 76, 176, 176A, 176B, 276A of the present invention are incompressible material upon which the beads 38, 68 may compress against to provide sealing.

Specifically, FIGS. 1B and 4B illustrate the embodiment where the coatings 76A, 176A, 176B, 276A are only disposed in the depression 42 in the land areas 78, 178, which are not completely disposed around the openings 16, 116, 216. This embodiment may be preferred since it would cost less to dispose a smaller amount of the coatings 76A, 176A, 176B, 276A in a smaller area, and yet provide better sealing in the land areas 78, 178 of the engine, which are exposed to the increased heat, pressure, and forces that are experienced by the gasket adjacent the openings 16, 116, 216.

Figure 8:
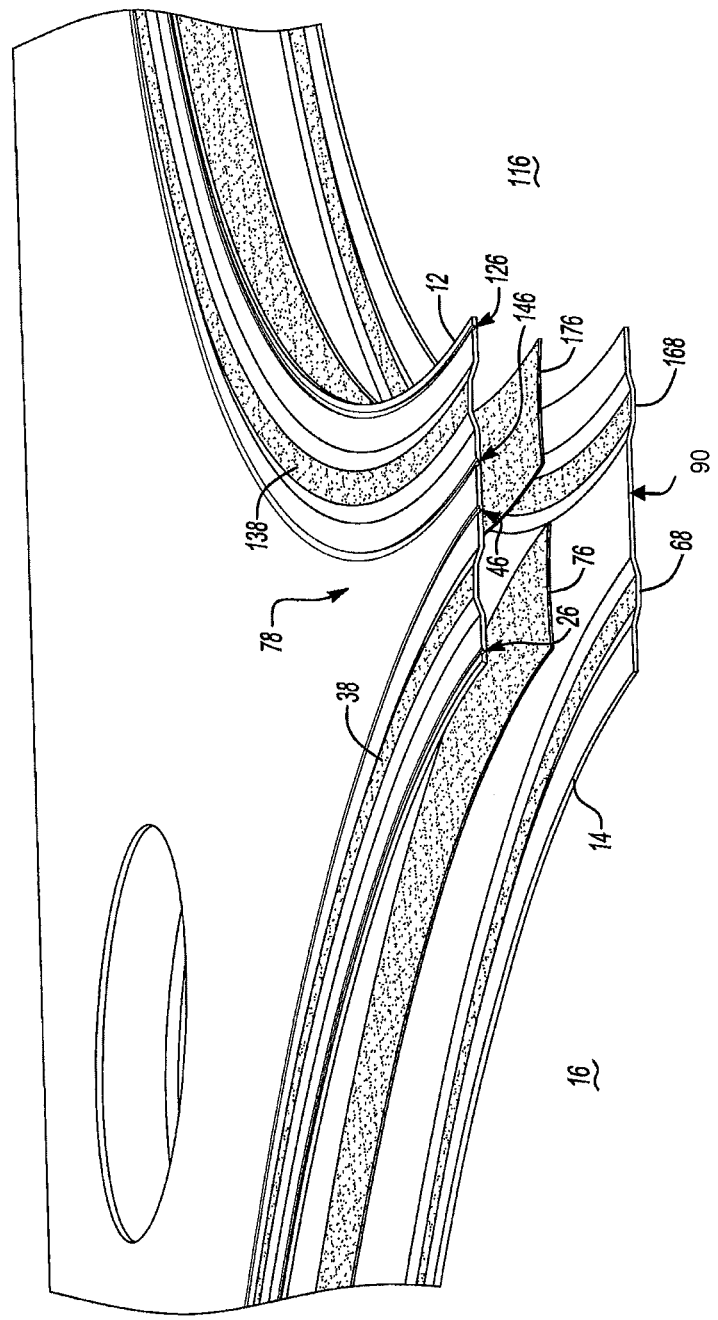
FIG. 8 is an exploded perspective cross-section view along lines 7-7 of FIG. 6.

FIGS. 6-8 further illustrate the embodiment of the gasket 10 shown in FIG. 1A, between the combustion openings 16, 116, including the common land area 78. Specifically, FIG. 6 shows the first beads 26, 126 being disposed at the peripheral edge of their corresponding combustion openings 16, 116. Disposed axially outwardly from the first beads 26, 126 are the second beads 38, 138 and the third beads 46, 146. In hatch-marks, are illustrated the coatings 76, 176 that are below the corresponding second beads 38, 138.

FIG. 7 illustrates the details of a cross sectional area between the combustion openings 16, 116 with the land area 78 therebetween. This view includes a common land area 90 on the second metallic layer 14 that is directly below the first metallic layer land area 78. As mentioned above, the disclosure attributed to the base combustion opening items 16, 18, 76, 78, 16, and 76, apply to the equivalent extended combustion opening items 116, 118, 178, 216, and 276, that are associated with the area around additional openings 116, 216. Also, the items with three digits from 116 to 174 are functionally the equivalent of their counterpart items with two digits from 16 to 74.

FIG. 8 shows the vertical relationship between the first and second layers 12, 14 and their respective coatings 76, 176. As can be seen, the first, second, and third beads 26, 38, 46 and 126, 138, 146 in the first metallic layer 12 are separated from the first beads 68, 168 in the second metallic layer 14 by the coatings 76, 176. The coatings 76, 176 are located in respective first metallic layer depressions 42, 142.

Figure 11:
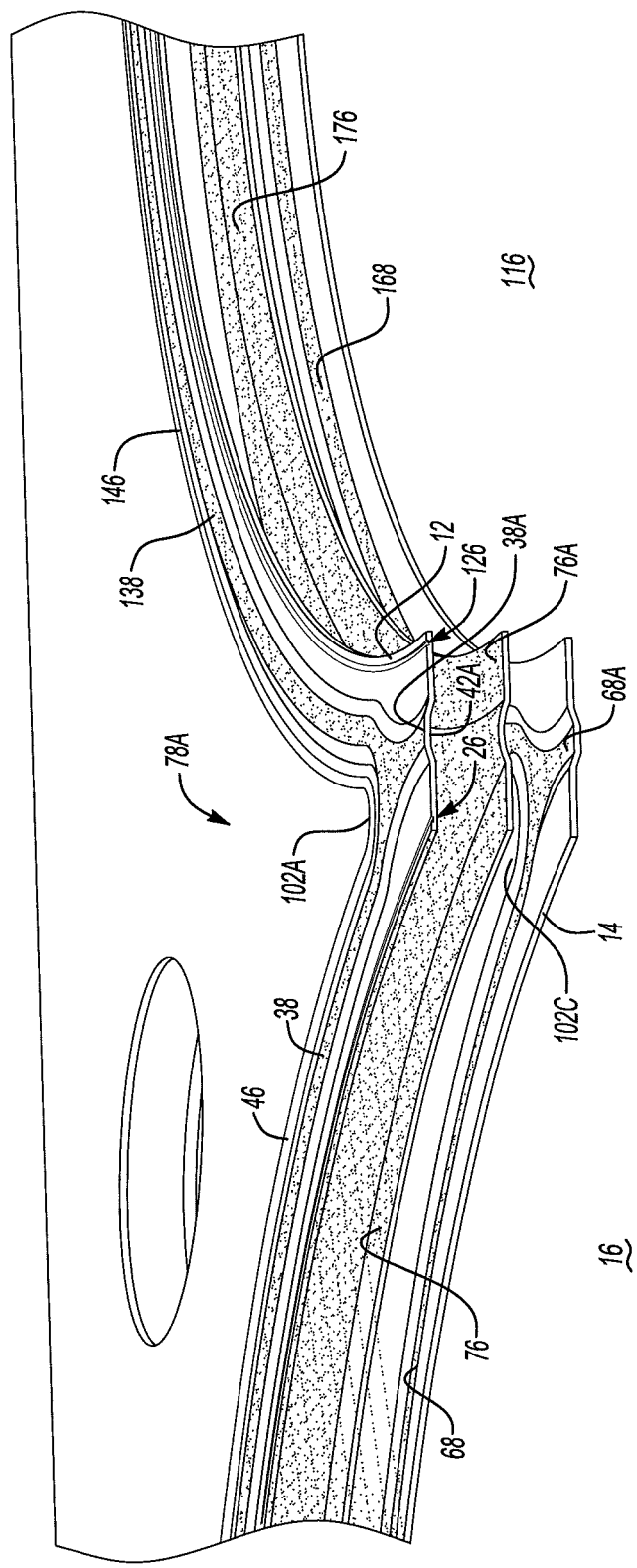
FIG. 11 is an exploded perspective cross-section view along lines 10-10 of FIG. 9.

FIGS. 9-11 illustrate another embodiment of the gasket 10 associated with the combustion openings 16, 116, including the common land area 78A therebetween. Specifically, the first beads 26, 126 are disposed at the peripheral edge of their corresponding combustion openings 16, 116. Disposed axially outwardly in the first layer 12, from the first beads 26, 126, are the second beads 38, 38A, 138 and the third beads 46, 146. Disposed axially outwardly in the second layer 14, from the combustion opening edges 60, 160 are the second beads 68, 68A, 168. In FIG. 9, the coatings 76, 76A, 176 are shown in hash-mark representation. The coatings 76, 76A, 176 are located on the underside of the upper layer 12 between the beads 26 and 126 in the land area 78A (see FIG. 11), and are otherwise located between the beads 26 and 46, and 126 and 146.

The first bead 126 forms a first depression 128 in the upper surface 20 of the first layer 12 because it is concave. As the first bead 126 extends consistently through the first layer 12, it creates a first crest 130, or convex shape, in the lower surface 22 of the first layer 12.

The first depression 128 and first crest 130 may or may not be concave and convex, respectively, in the curvilinear sense. It is within the scope of the present invention for the depression 128 to have a planar floor 132 and for the crest 130 to have a planar surface 134.

In the embodiment of FIGS. 9-11, the beads 38, 138, 68, 168 and coatings 76, 76A, 176 come together in the land area 78A, between merge points 102A, 102B on the upper layer 12, and between lower layer merge point 102C and a lower layer equivalent merge point (not shown). This lower equivalent merge point would be directly below merge point 102B, to form the single beads 38A, 68A, with the coating 76A thereunder.

While only one example of the upper merge points 102A, 102B is depicted, it is within the scope of the present invention to locate the merge points 102A, 102B deeper between the two openings 16, 116 or to have the merge points 102A, 102B occur more in a back land area of the gasket 10. This would also apply to the lower merge points 102C and the not shown equivalent lower merge point below upper merge point 102B.

FIG. 10 illustrates the details of a cross sectional area between the combustion openings 16, 116 with the land area 78A therebetween. In this embodiment, the single bead 38A is formed in a one-piece, integrally formed, unitary fashion with the land 36 in the first layer 12. The single bead 38A preferably has a convex shape. The bead 38A forms a crest 40A in the upper surface 20 of the first layer 12 and it creates a depression 42A in the lower surface 22 of the first layer 12.

The upper surface 20A of the bead 38A is curved and it is not planar with the upper surface 20 of the land 36 or a land 44A, described below, of the first layer 12.

The coating 76A is preferably located along the lower surface 22 of the first layer 12 between the beads 26, 126, in the land area 78A between the combustion openings 16, 116. The coating 76A may have a constant thickness through the land area 78A or the thickness of the coating 76A may vary through the land area 78A. Further, the coating 76A may be substantially constant in its thickness axially between the combustion openings 16, 116 or the thickness may vary axially between the openings 16, 116.

The bead 68A is formed in a one-piece, integrally formed, unitary fashion with the land 66 in the second layer 14. The bead 68A forms a depression 70A in the upper surface 62 of the second layer 14 because it is concave. As the bead 68A extends consistently through the second layer 14, it creates a crest 72A, or convex shape, in a lower surface 64 of the second layer 14.

A land 74A is formed in a one-piece, integrally formed, unitary fashion with the bead 68A in the second layer 14. The upper and the lower surfaces 62, 64 of the second layer 14 in the area of the land 74A are substantially parallel.

Preferably, the first and second layers 12, 14 are arranged such that the second layer land 66 is axially aligned with the first layer land 24, the first layer bead 26, and the first layer land 36. It is also preferred that the second layer bead 68A is axially aligned with the first layer bead 38A. Also, it is preferred that the second layer land 74A is axially aligned with at least the first layer land 44A, bead 126, and at least partially aligned with land 124 of the first layer 12.

FIG. 11 shows the vertical relationship between the first and second layers 12, 14 and the coatings 76, 76A, 176. As can be seen, the three beads 26, 38A, 126 in the first metallic layer 12 and the single bead 68A in the second layer 14 are separated by the coatings 76, 76A, 176. The coatings 76, 176 are located on the first metallic layer lower surface 22 and the coating 76A is located in the depression 42A.

Figure 12:
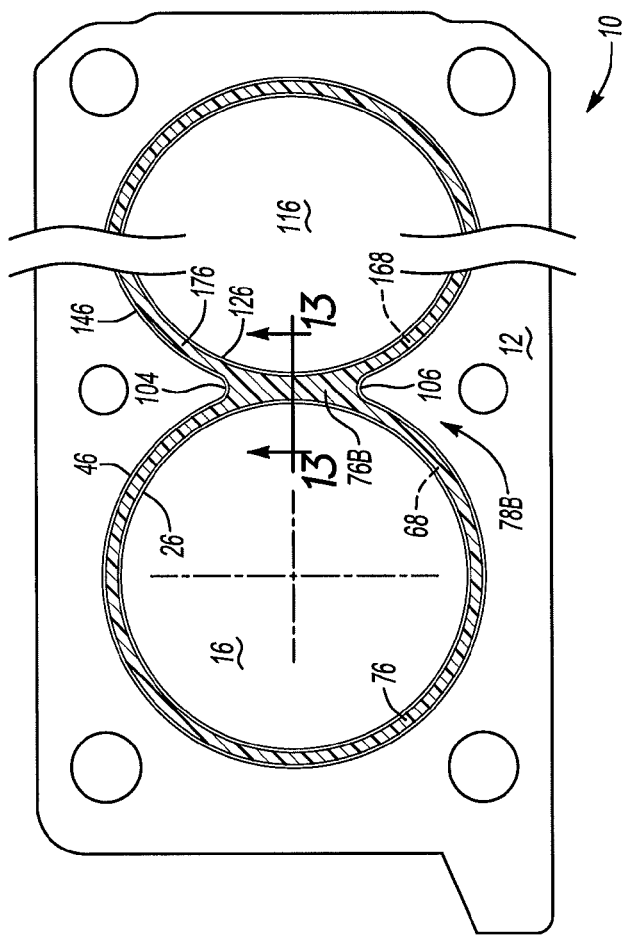
FIG. 12 is a partial plan view of another gasket in accordance with the present invention.
Figure 13:
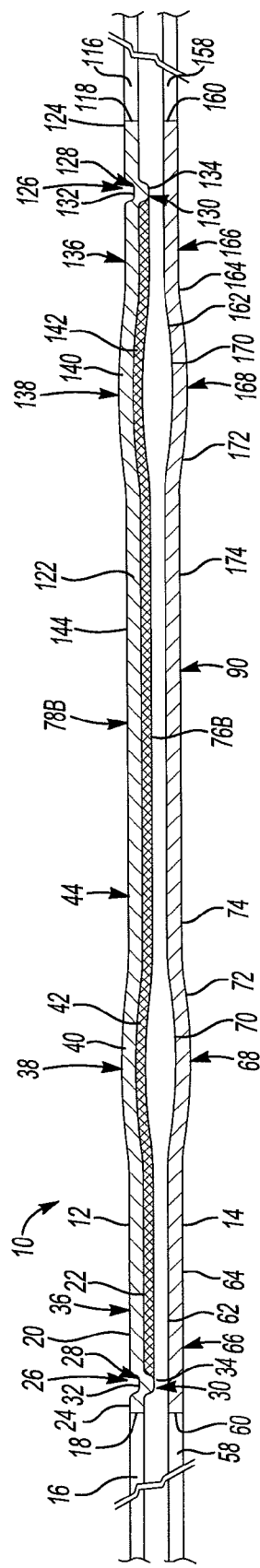
FIG. 13 is a cross-section view along lines 13-13 of FIG. 12.
Figure 14:
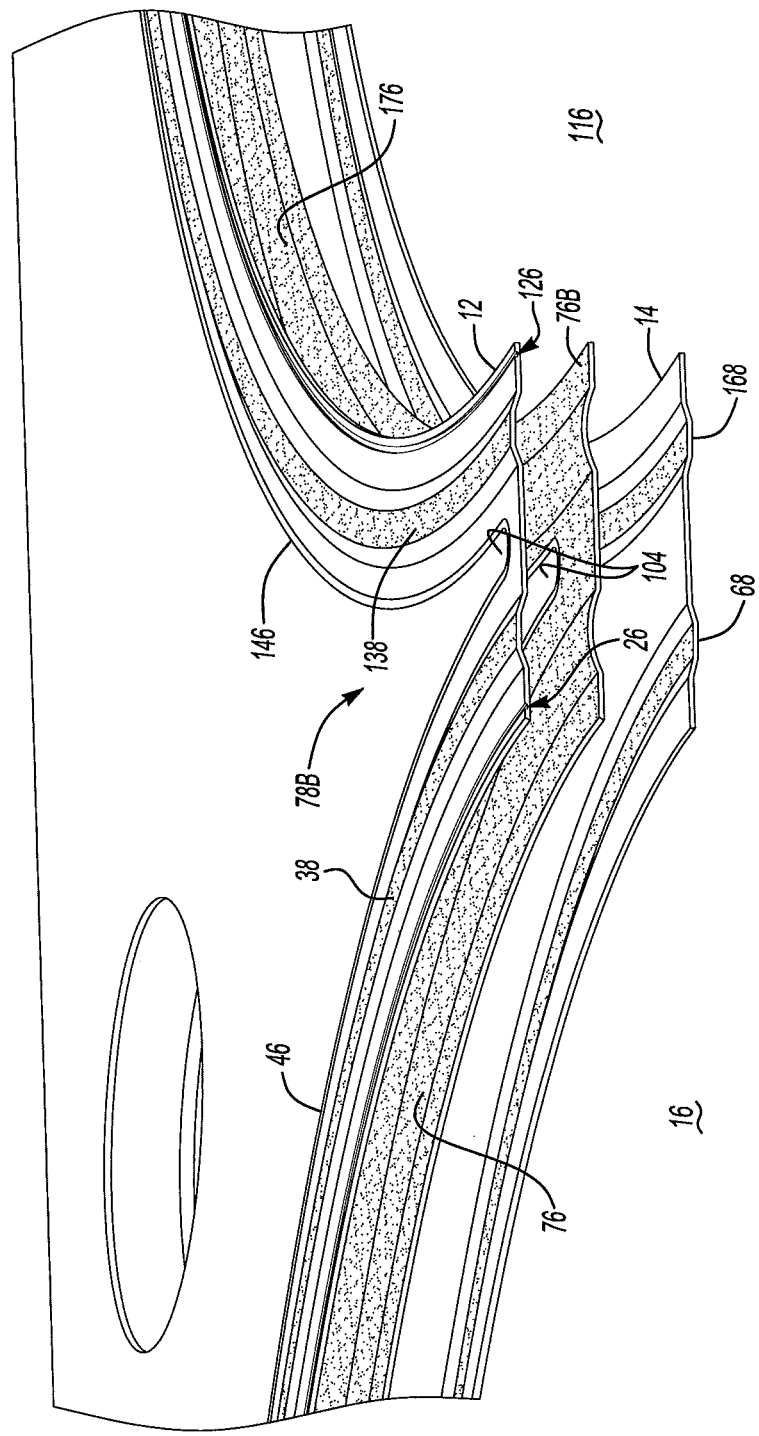
FIG. 14 is an exploded perspective cross-section view along lines 13-13 of FIG. 12.

FIGS. 12-14 illustrate yet another embodiment of the gasket 10 associated with the combustion openings 16, 116, including the land area 78B therebetween. Disposed axially outwardly from the first beads 26, 126 are the second beads 38, 38A, 68, 68A and the third beads 46, 146. In FIG. 12, the coatings 76, 76B, 176 are shown in hash-mark representation. The coatings 76, 76B, 176 are located on the underside of the upper layer 12 between the beads 26 and 126 in the land area 78B, and are otherwise located on the underside of the upper layer 12 between the beads 26 and 46, and 126 and 146.

In the embodiment of FIGS. 12-14, the beads 38, 138, 68, 168 pass through the land area 78A, without merging. However, the coatings 76, 176 come together to form the coating 76B in the land area 78A between a rear merge point 104 and a forward merge point 106 (see FIG. 12).

While only one example of the merge points 104, 106 is depicted, it is within the scope of the present invention to locate the merge points 104, 106 deeper between the two openings 16, 116 or to have the merge points 104, 106 occur more in a back land area of the gasket 10.

FIG. 13 illustrates the details of a cross sectional area between the combustion openings 16, 116 with the land areas 78B, 90 therebetween. In this embodiment, the beads 38, 138 remain separately formed in a one-piece, integrally formed, unitary fashion with the respectively separate lands 36, 136 in the first layer 12. The single beads 38, 138 preferably have a convex shape. The beads 38, 138 respectively form a crest 40, 140 in the upper surface 20 of the first layer 12, which in turn create respective depressions 42, 142 in the lower surface 22 of the first layer 12.

The upper surface 20 of the beads 38, 138 are curved and not planar with the upper surface 20 of the lands 36, 136 or lands 44, 144, described below, of the first layer 12.

The coating 76B is preferably located along the lower surface 22 of the first layer 12 between the beads 26, 126, in the land area 78B between the combustion openings 16, 116. The coating 76B may have a constant thickness through the land area 78B or the thickness of the coating 76B may vary through the land area 78B. Further, the coating 76B may be substantially constant in its thickness axially between the combustion openings 16, 116 or the thickness may vary axially between the openings 16, 116.

The beads 68, 168 are respectively formed in a one-piece, integrally formed, unitary fashion with the lands 66, 166 in the second layer 14. The beads 68, 168 respectively form a depression 70, 170 in the upper surfaces 62, 162 of the second layer 14 because they are concave. As the beads 68, 168 extend consistently through the second layer 14, they respectively create a crest 72, 172, or convex shape, in lower surfaces 64, 164 of the second layer 14.

Lands 74, 174 are respectively formed in a one-piece, integrally formed, unitary fashion with the beads 68, 168 in the second layer 14. The upper and the lower surfaces 62, 162 and 64, 164 of the second layer 14 in the area of the lands 74, 174 are substantially parallel.

Preferably, the first and second layers 12, 14 are arranged such that the second layer land 66 is axially aligned with the first layer land 24, the first layer bead 26, and the first layer land 36. It is also preferred that the second layer bead 68 is axially aligned with the first layer bead 38. Also, it is preferred that the second layer lands 74, 174 are axially aligned with at least the first layer lands 44, 144, the bead 126, and at least partially the lands 24, 124 of the first layer 12.

Preferably, the first and second layers 12, 14 are arranged such that the second layer land 166 is axially aligned with the first layer land 24, the first layer bead 126, and the first layer land 136. It is also preferred that the second layer bead 168 is axially aligned with the first layer bead 138. Also, it is preferred that the second layer lands 74, 174 are axially aligned with at least the first layer lands 44, 144, bead 26, and at least partially land 24 of the first layer 12.

FIG. 14 shows the vertical relationship between the first and second layers 12, 14 and the coatings 76, 76B, 176. As can be seen, starting above the merge point 124, from the left edge of the first metallic layer 12, there are six beads 26, 38,

46, 146, 138, 126. Except for the land area 78B between the combustion openings 16, 116, the coating 76 extends axially outward from the combustion opening 16, beginning at the inside edge of the bead 26 and then up to the outside edge of the bead 46. Except for the land area 78B between the combustion openings 16, 116, the coating 176 extends axially outward from the combustion opening 116, beginning at the inside edge of the bead 126 and then up to the outside edge of the bead 146.

As further shown in FIG. 14, at the rear merge point 104 of the land area 78B between the combustion openings 16, 116, the coatings 76, 176 merge to form the coating 76B, which then extends onto the forward merge point 106. At this point 106, the coating 76B returns to the separate coatings 76, 176. The coatings 76, 76B, 176 are disposed on the underside of the first metallic layer 12 (also see FIG. 12).

Now referring to FIG. 5, a method of providing a combustion opening seal in the gasket 10 comprises the step of first providing the first and second metallic layers 12, 14 discussed above. It further comprises locating the coating 76 in contact with at least one of the first layer first bead 26, the first layer second bead 38 and the first layer third bead 46.

In this location, the coating 76 permits the beads to be fully compressed between the head 80 and the block 82 by functioning as a largely incompressible foundation. The compression of the layers 12, 14 causes the layers 12, 14 to flatten against one another, including the various beads 38, 68 mentioned above. As a result, the first and second layers 12, 14 together form a substantially planar intersection plane 84 between them, between adjacent combustion openings 16, and axially between the first bead 26 and the third bead 46 of the first layer 12. In this state, a lower surface 86 of the coating 76, opposite a coating upper surface 88 in contact with the lower surface 22 of the first layer 12, is placed in substantially planar contact with the upper surface 62 of the second layer 14. The upper surface 62 of the second layer 14 is opposite the lower surface 64 of the second layer 14. Being so compressed, the upper surface 20 of the first layer 12 and the lower surface 64 of the second layer 14 become substantially parallel with one another.

The method described hereabove may be applied to all embodiments of the present invention.

Consequently, the use of a coating with a gasket, as detailed above, is advantageous over the current state of art in "shim stopper" gaskets because the present invention does not require a steel layer of a constant thickness between two active layers. For the instant invention, varying the thickness of the gasket at the mid-spans between combustion chambers is much easier to control than with metal shims, thereby improving sealing properties, while lowering manufacturing and material costs of the gasket over a gasket requiring a shim.

The above-described embodiments replace a shim with a first metallic layer having an embossment with a possible coating disposed therein. For example, the coating may be rubber, or a synthetic rubber material, adapted for the cyclic high temperature and high pressure environment of a cylinder head gasket. The coating may also be a bronze powder encapsulated within an epoxy material. Other materials robust enough to survive for prolong periods of time adjacent a combustion opening for an internal combustion engine may also be used.

Consequently, the structure of the gasket 10 results in reduced cost because a shim layer costs more than the coating material in an embossment(s) of a first metallic layer. Also, the gasket 10 simplifies the assembly of a head gasket by not using a mechanical locking method to attach the shim layer to the spacer layer, but instead the coating is printed into an embossment of the first metallic layer via existing production processes. This results in a gasket where the embossment in the first metallic layer can have a variable depth in order to create height topography at the combustion seal. This is a benefit over shim type designs where varying heights between bores is needed.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A gasket, comprising:
   a first metallic layer, comprising:
   at least one combustion opening therein, wherein the opening is circumscribed by a combustion opening edge of the first layer;
   an upper surface and a lower surface of the first layer extend radially outward from the combustion opening edge, the surfaces being substantially parallel to one another, and the surfaces defining between them a unitary first land directly radially outward from the combustion opening edge;
   a first bead formed in a unitary fashion with the first land, the first bead forming a first depression in the upper surface and a first crest in the lower surface;
   a second land formed in a unitary fashion with the first bead;
   a second bead formed in a unitary fashion with the second land, the second bead forming a second crest in the upper surface and a second depression in the lower surface;
   a third land formed in a unitary fashion with the second bead;
   a third bead formed in a unitary fashion with the third land, the third bead forming a third depression in the upper surface and a third crest in the lower surface;
   a coating selectively located only along the lower surface of the first layer between the first crest and the third crest; and
   a fourth land formed in a unitary fashion with the third bead;
   wherein the upper surfaces of the first land, the second land, the third land and the fourth land are substantially planar with one another and the lower surfaces of the first land, the second land, the third land and the fourth land are substantially planar with one another;
   a second metallic layer located directly beneath the first layer, comprising:
   at least one combustion opening therein, wherein the opening is circumscribed by a combustion opening edge of the second layer and the second layer combustion opening edge is aligned with the first layer combustion opening edge; and
   a first land, a second land, and a single bead formed in a unitary fashion with both lands, the second metallic layer having no other structures between the combustion opening and the radially outboard extent of its second land;
   wherein the second layer first land is directly beneath the first layer first land, the first layer first bead, and the first layer second land;
   wherein the second layer bead is directly beneath the first layer second bead,
   wherein the second layer second land is directly beneath at least the third land, the third bead, and, at least partially, the fourth land of the first layer; and wherein, when an engine head and an engine block compress the first and second metallic layers together, the first and third crests of the first metallic layer are brought into contact with the second metallic layer and the first metallic layer is flattened against the second metallic layer to form a substantially planar intersection plane therebetween.

2. The gasket of claim 1, wherein both upper and lower surfaces of the first and second metallic layers remain substantially parallel to one another with substantially constant thickness.

3. The gasket of claim 1, wherein the first bead of the first layer is concave with a planar floor, the third bead of the first layer is concave with the planar floor, and the first and third crests of the first layer have a planar surface.

4. The gasket of claim 1, wherein the second bead has a convex shape.

5. The gasket of claim 1, wherein an angle of incline of the second bead in the first layer is less steep than an angle of incline of the first bead and the angle of incline of the third bead in the first layer is approximately the same as the angle of incline required to form the first bead.

6. The gasket of claim 1, wherein the first and second beads have planar floors that are on the same horizontal plane with one another, and the planar floors are vertically offset from the upper surface of the first layer.

7. The gasket of claim 1, wherein the gasket has only two metallic layers.

8. The gasket of claim 1, wherein the first, second, and third lands of the first layer are integrally formed therewith, and the first land, second land, and the bead of the second layer are integrally formed therewith.

9. The gasket of claim 1, wherein the bead of the second layer extends consistently therethrough and creates a first crest that is convex in shape, in the lower surface of the second layer.

10. The gasket of claim 1, wherein the second layer second land is axially aligned with at least the first layer third land, the third bead, and at least partially the fourth land of the first layer.

11. The gasket of claim 1, wherein each of the two metallic layers has at least two adjacent combustion openings and, in an area between the two adjacent combustion openings, each of the first layer fourth lands of respective adjacent combustion openings are adjoined therebetween, and each of the second layer second lands of respective adjacent combustion openings are adjoined therebetween.

12. The gasket of claim 1, wherein each of the two metallic layers has at least two adjacent combustion openings and, in a common area between the two adjacent combustion openings, each of the first layer second beads of respective adjacent combustion openings, along with the first layer coating on the lower surfaces thereof, are adjoined in the form a single bead and single coating through the common area between the two adjacent combustion openings.

13. The gasket of claim 1, wherein each of the two metallic layers has at least two adjacent combustion openings and, in a common area between the two adjacent combustion openings, each of the first layer second beads of respective adjacent combustion openings, along with the first layer coating on the lower surfaces thereof, are adjoined in the form a single land and single coating through the common land area between the two adjacent combustion openings.

* * * * *